United States Patent [19]

Shintani et al.

[11] Patent Number: 5,796,706
[45] Date of Patent: Aug. 18, 1998

[54] INFORMATION RECORDING APPARATUS

[75] Inventors: Toshimichi Shintani, Koganei; Ryo Imura, Tokorozawa; Kimio Nakamura, Kokubunji; Sumio Hosaka, Tokyo, all of Japan

[73] Assignee: Hitachi, Ltd., Tokyo, Japan

[21] Appl. No.: 976,505

[22] Filed: Nov. 24, 1997

Related U.S. Application Data

[63] Continuation of Ser. No. 629,294, Apr. 8, 1996, abandoned.

[30] Foreign Application Priority Data

Apr. 11, 1995 [JP] Japan ................................. 7-085081

[51] Int. Cl.$^6$ ............................................. G11B 7/00
[52] U.S. Cl. ............................... 369/126; 369/44.14
[58] Field of Search ........................ 369/126, 54, 58, 369/47, 48, 49, 59, 44.28, 44.14; 250/306, 307

[56] References Cited

U.S. PATENT DOCUMENTS

| | | | |
|---|---|---|---|
| 5,404,349 | 4/1995 | Nose et al. | 369/126 |
| 5,432,771 | 7/1995 | Shido et al. | 369/126 |
| 5,481,522 | 1/1996 | Oguchi et al. | 369/126 X |

FOREIGN PATENT DOCUMENTS

| | | |
|---|---|---|
| 6231495A | 8/1994 | Japan . |
| 6259821A | 9/1994 | Japan . |

OTHER PUBLICATIONS

J. Appl. Phys., vol. 59, No. 10, May 15, 1986; pp. 3318–3327.

Appl. Phys. Lett., vol. 61, No. 2, Jul. 13, 1992, pp. 142–144.

K. Kato, A. Kozen, Y. Muramoto, Y. Itaya, T. Nagatsuma, and M. Yaita: 110–GHz, 50% Efficiency Mushroom–Mesa Waveguide p–i–n Photodiode for a 1.55–μm Wavelength; IEEE Photonics Technology Letters, vol. 6, pp. 719–721 (Jun. 1994).

Primary Examiner—Muhammad N. Edun
Attorney, Agent, or Firm—Kenyon & Kenyon

[57] ABSTRACT

An information recording apparatus having a light generator for emitting light as a signal of information being recorded, a probe formed of an optical fiber for physically or chemically changing a recording medium on the basis of the light, a slider coupled to the probe and maintaining the distance between the tip of the optical fiber and the recording medium to be within the radius of an aperture provided at the tip of the optical fiber when recording is made, a medium support for supporting the recording medium, and a medium driving mechanism for driving the recording medium to move.

4 Claims, 5 Drawing Sheets

FIG. 7

INFORMATION RECORDING APPARATUS

This application is a continuation of application Ser. No. 08/629,294, filed on Apr. 8, 1996 now abandoned.

BACKGROUND OF THE INVENTION

The present invention relates to techniques for information recording, and particularly to apparatus necessary for achieving high-density recording.

The conventional recording techniques include, for example, magnetic recording, optical recording, and magneto-optical recording. The magnetic recording technique records information by the magnetization of a magnetic medium, and this magnetized state is detected by a magnetic head so that the information can be reproduced from the magnetic medium. The optical recording means detects the holes formed in a medium in accordance with "0"s and "1"s of information by making a light beam incident to the medium and by detecting the reflected light from the medium. The magneto-optical recording means records magnetic domains corresponding to "0"s and "1"s of information in a magnetic medium and reproduces them therefrom by using a light beam. The recording density of about $2 \times 10^9$ bits/inch$^2$ can now be achieved.

The conventional recording techniques and recording systems can be considered to have a limit to the high-density recording. The light focusing ability in the techniques using light rays is restricted by the diffraction limit of light. The magnetic heads now used in the magnetic recording system can be considered to have a limit to the detection of recorded domains. For the above reasons, it will be supposed that the recording unit density cannot be increased to $1 \times 10^{11}$ bits/inch$^2$ or above by the prior art.

SUMMARY OF THE INVENTION

Accordingly, it is an object of the invention to provide an apparatus capable of recording information at a very high density which could not to be achieved by the prior art.

The above object can be attained by the application of probe microscopy to information recording apparatus.

In the present invention, the probe of the probe microscope serves as the head for recording and reproducing information. Upon recording information, the probe and the medium are interacted to produce physical or chemical changes as recorded units. Upon reproduction, the recorded units produced by the above means are detected by the probe.

The interaction between the probe and the medium is concerned with all physical quantities which can be detected by the scanning probe microscope. In other words, the physical quantities include current, force, light, electric field, magnetic field, electromagnetic field, electric charge, magnetization, heat, atomic nuclear spin, electron spin, bonding state or electron state of atoms or molecules in the surface or interior of the medium or probe, and electromagnetic excitement of the surface or interior of the medium or probe.

Figure 1:
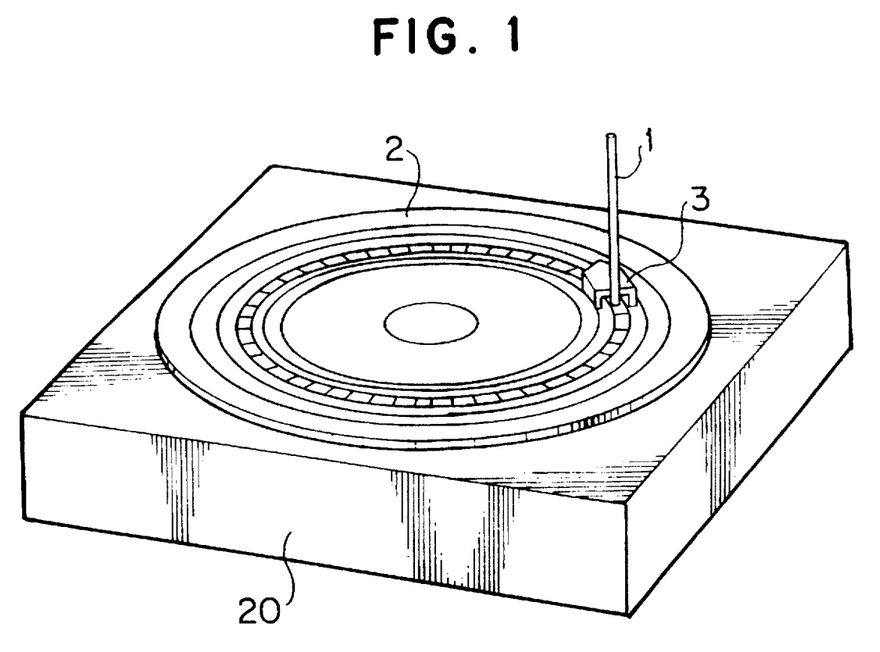
FIG. 1 is a conceptional diagram of the invention.
Figure 2:
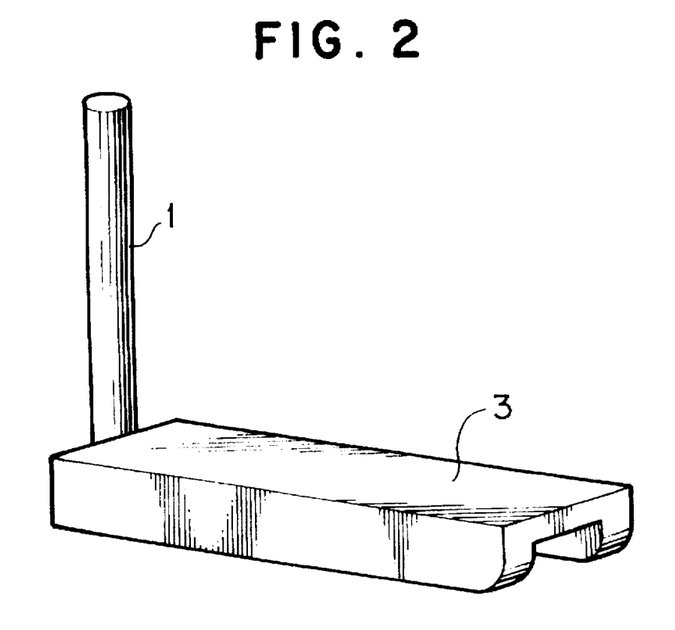
FIG. 2 is a diagram to which reference is made in explaining the method of floating the probe in air or in liquid.

The medium may be a disk 2 as shown in FIG. 1. The disk 2 is driven to rotate by a disk drive 20. When the disk 2 is rotated, the probe 1 mounted on a slider 3 is moved in the radius direction of the disk 2. Although the distance between the head and the medium can be controlled by detecting the interaction such as interatomic force between the head and the medium and maintaining the signal intensity constant, the slider 3 may have the structure by which the air flow caused by the movement of the probe or the medium can be conducted between the probe and the medium when it is attached to the tip of the probe 1 as shown in FIG. 2. The air flow forces the probe to be floated away from the medium. In this case, the air may be other gases. Also, a liquid may be forced to flow between the probe and the medium. Moreover, the probe may have a tip protector provided at its tip and kept in contact with the medium, while the medium or probe is moved to record or reproduce information. In this case, as in the typical probe microscopy, the distance between the probe and the medium can be controlled by the interaction between the probe and the medium. The distance control by the interaction may be performed not so frequently, but instead at a lower frequency than the bit frequency of information. The above floating or contact type distance control may be combined with the interaction type control.

When the disk 2 is rotated, the evolution rate R per second is set in the range defined by the following equation (1), $$10^8/(\pi d_1 \sqrt{B}) \leq R \leq 2 \times 10^9/(\pi d_2 \sqrt{B}) \tag{1}$$

where $\pi$ is the ratio of the circumference of a circle to its diameter, B is the recording density in bits/inch$^2$, $d_1$ (inch) is the outer diameter of the data region on the disk, and $d_2$ (inch) is the inner diameter of the data region.

Figure 3:
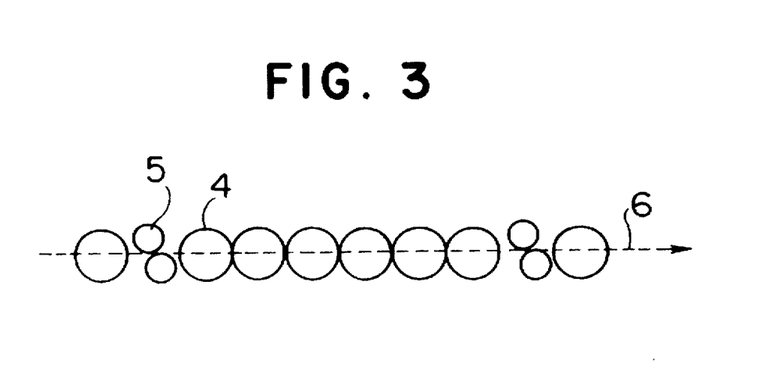
FIG. 3 is a diagram to which reference is made in explaining the probe tracking method.

The tracking method for the probe 1 will be described. The respective parts of paired marks 5 for tracking are written to be displaced from a track center 6 along which recorded units 4 are arranged on the medium as shown in FIG. 3. The probe passes around the track center, and the deviations of the tracking marks 5 from the track center 6 are detected from the signal produced at the marks 5. Thus, the probe can be corrected for its position. It is assumed that the amount of deviations of marks 5 from the track center is 25% of the track width.

In addition, the medium is produced to have a surface roughness of 10 nm to 200 nm to a period of 1 µm or above or less than 20 nm to a period lower than 1 µm. The medium of such surface roughness can be easily achieved by the thin film technology such as molecular beam epitaxy technology. In this case, when the medium is in a stationary state in which the recording and reading operations are not performed, the head is separated away from the medium.

The above-mentioned medium may be the non-detachable type one which the user cannot freely detach from or mount in the recorder as is the currently used hard disk, or may be the detachable type such as the floppy disk.

Also, the copy of the disk produced as above can be made by a replica method in which a material that can be caked is coated and peeled off.

The recorder has a vibration-free mechanism provided relative to the medium or head.

The domains of substantially the same size as a very small aperture formed in an opaque material can be written and read by a local electromagnetic field that is produced by the incidence of light to the very small aperture, as E. Betzig et al. reported in Applied Physics Letters, No. 61, Vol. 2, pp. 142–144. This technology is called scanning near-field optical microscope (hereinafter abbreviated SNOM).

In the method using SNOM, the distance between the head and the medium may be maintained less than the diameter of the very small aperture at the tip of the probe. Even in this case, the revolution rate of the disk 2 may be set within the range of the equation (1). The tracking for the head can also be achieved by previously writing the above-mentioned marks 5 for tracking at positions deviated from the track center 6 as shown in FIG. 3.

The recorder using the scanning probe microscope may use the medium of the structure in which it is raster scanned without being rotated unlike the disk. In this case, the distance between the probe and the medium can be controlled as above by the slider type structure, contact type structure or the probe-medium interaction detection type.

In this case, the scanning speed v (meters/second$^2$) on the medium is specified to meet the following equation:

$$10^6/\sqrt{B} \leq v \leq 2 \times 10^{11}/\sqrt{B} \quad (2)$$

where B is the recording bit density in bits/meter$^2$.

Also in this case, the head is controlled to track along the marks previously written on the medium, and the medium used has a surface roughness of 200 nm to a period of 1 μm or above, or 20 nm to a period of 10 nm to 1 μm. In addition, the vibration-free mechanism mentioned above is provided.

The probe microscope has a resolution of atom size to nanometers, and can make atom or cluster working and physical or chemical changes on a sample to an extent of a nanometer-class size. The properties of the probe microscope can be utilized for the information recording apparatus. If recording is made on the medium at the highest density of successive 80- nm diameter circles as recorded units, the attained density of recorded information corresponds to about $1 \times 10^{11}$ bits/inch$^2$. If recording is performed at respective atoms as recorded units on the medium that is made of solid beryllium with 2.29 Å lattice constant, the density of recorded information can reach about $1.3 \times 10^{16}$ bits/inch$^2$.

The scanning area of the probe microscope is generally small. This is ascribed to the fact that the piezo-electric element for the scanning operation of the probe microscope does not move a long distance. As described above, if the medium is a disk, the necessary movement of the probe is only in the radius direction of the disk, and thus this problem can be solved. In addition, since the disk can be relatively stably rotated, the frequency at which the head is out of track can be reduced.

The distance between the head and the medium can be controlled by detecting the intensity of the interaction between the probe and the sample as in the usual scanning probe microscope. However, this method can make high precision control, but has the disadvantage that it takes a long time to control. This drawback can be removed by utilizing the SNOM technology. In SNOM, the theoretical calculation of the intensity of the local electromagnetic field produced from the very small aperture was reported by U. Durig et al. in Journal of Applied Physics, No. 59, Vol. 10, pp. 3318–3327. According to the report, the local electromagnetic field intensity from the very small aperture is almost unchanged relative to the distance when the distance from the aperture is less than the radius of the aperture. Thus, the time necessary for the control can be eliminated by the application of this property. In other words, a properly designed slider is provided at the tip of the probe so that the slider can control the distance between the aperture and the medium to be automatically controlled to be less than the radius of the aperture. Even if the distance between the aperture and the medium is changed within the radius of the aperture, the produced signal intensity does not depend on the distance. Therefore, high-speed and high-precision detection can be performed.

As to the moving speed of the medium of a disk-shape, the revolution rate of the disk is specified to meet the equation (1). For raster scanning, the equation (2) is satisfied. Thus, the recorded information reading speed, or the data transfer rate is in the range of 1 MHz to 200 GHz. The value of 200 GHz is the upper limit of the present response speed of the photodiode used for light detection.

The tracking technique will be mentioned. If the deviations of the marks 5 from the track center 6 in FIG. 3 are represented by $\pm\epsilon_0$, the track width by q, and the deviation of the probe from the track center by $\epsilon$, the detected signal i resulting from detecting the marks 5 by the probe can be expressed by $$i(\epsilon \pm \epsilon^0) = a + b \cos(2\pi(\epsilon \pm \epsilon_0)/q)$$

The output difference $\Delta i$ of this signal is expressed by $$i(\epsilon + \epsilon_0) - i(\epsilon - \epsilon_0) = 2b \sin(2\pi\epsilon_0/q)\sin(2\pi\epsilon/q)$$

Figure 4:
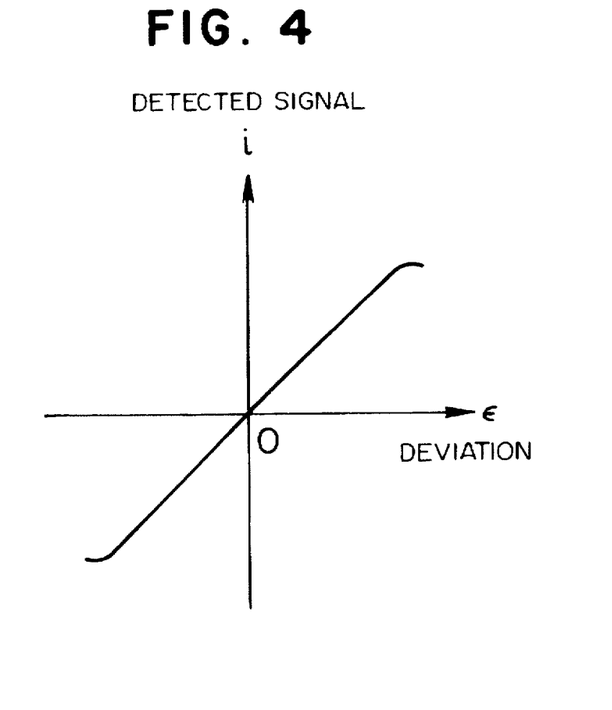
FIG. 4 is a graph of the out-of-track signal.

Thus, the signal i shown in FIG. 4 can be obtained with respect to the amount of deviation $\epsilon$ of the probe. Here, if the amount of deviation $\epsilon_0$ of the marks 5 from the track center 6 is 25% of the track width q, the $\Delta i$ is the maximum.

Since the scanning probe microscope needs high-precision control of the distance between the sample and the probe, it is not preferable to observe the sample of which the surface has a large value of roughness. Particularly when the distance between the head and the medium is controlled by the slider mentioned above, a high-speed operation is required. Thus, it is necessary to make the surface roughness of the medium as small as possible. The surface roughness of the medium is probably caused by the irregularity of cluster level and the relatively long-distance curves, such as deformation of the medium. Thus, such a medium is produced as to have a roughness of 10 nm to 200 nm to a period of 1 μm or above, and less than 20 nm to a period smaller than 1 μm. This medium can be produced by the thin film technology such as molecular beam epitaxy.

The usual magnetic recording techniques keep the head in contact with the medium when the medium and head are at a standstill. However, when the medium has its surface roughness reduced, the head once made in contact with the medium adheres to the medium, with the result that when the medium is started to rotate, the head is not floated away from the medium. This probably results in the medium or head being broken down. Therefore, when such a medium is used, the medium and head which are in a stationary state are necessary to be separated.

Moreover, if the medium is used as a floppy disk, the convenience and the flexibility of application can be improved.

In addition, the application of the already established replication will make it possible to copy a disk easily and a large amount thereof.

Since the scanning probe microscope needs precise control of the distance between the sample and the probe, the vibration is required to be reduced. Therefore, if at least the head or the medium has a vibration removing mechanism provided, this problem can be solved.

DETAILED DESCRIPTION

An embodiment of the magneto-optical recording of the invention using SNOM technology will be described.

Figure 5:
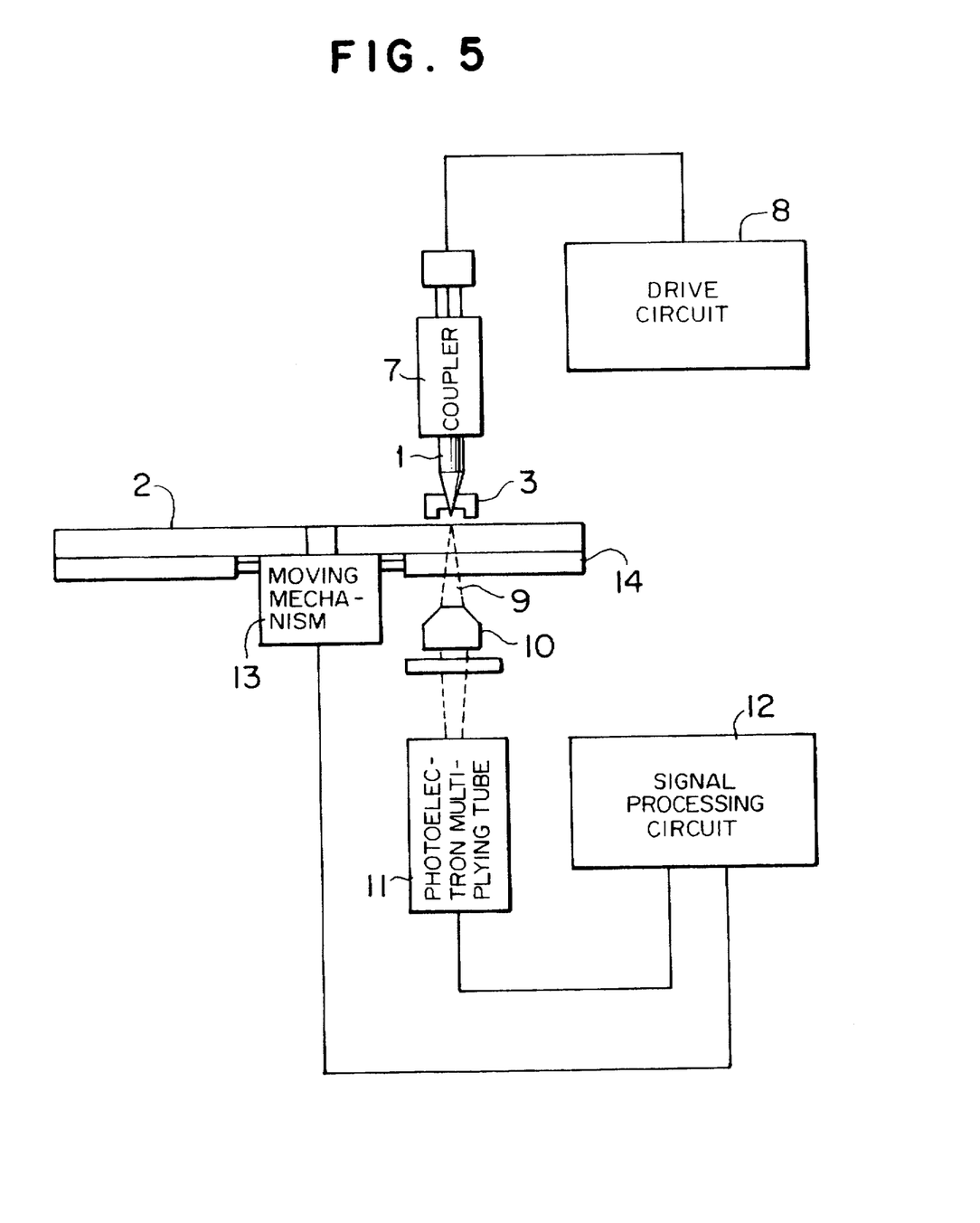
FIG. 5 is a diagram of a disk recording apparatus using SNOM as an embodiment of the invention.
Figure 6A:
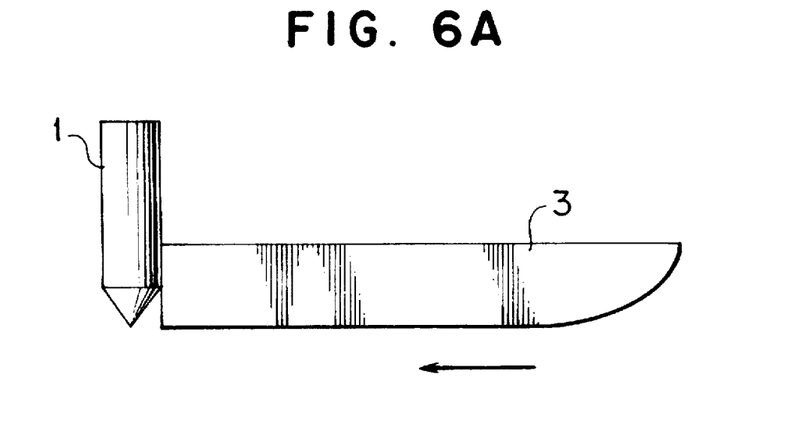
FIG. 6A is a side view of the head in FIG. 5.
Figure 6B:
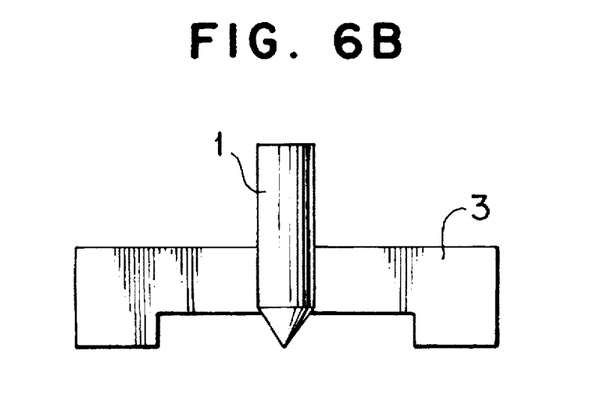
FIG. 6B is a front view of the head.

FIG. 5 shows an arrangement of this embodiment. The probe 1 is an optical fiber. The probe 1 has its tip sharped and the whole surface is coated with metal. The tip has an aperture of about 25 nm provided. In addition, the slider 3 is bonded to the tip of the probe, thus constituting the head. FIG. 6A is a side view of the head, and FIG. 6B is a front view of the head. As shown in FIG. 6A, the root of the slider 3 for air floating is attached to the tip of the probe 1. In FIG. 6B, the slider 3 is positioned behind the probe 1 side. The disk in FIG. 6A moves in the arrow direction, and as a result, the tip of the slider is floated away from the disk. Thus, the whole of the probe 1 attached to the back of the slider 3 is tilted to approach to the disk 2. The slider 3 is designed so that when the disk is moved at a predetermined speed, the distance between the probe 1 and the disk 2 is kept to be (10±5) nm. If the distance between the aperture and the medium is within the diameter, 25 nm of the aperture, the intensity of the propagated light produced at the surface of the medium is always substantially constant, and thus the modulation of the penetrated light intensity to be detected is due to the domain of the medium.

As shown in FIG. 5, a laser-fiber coupler 7 between a semiconductor laser and an optical fiber is able to make the laser beam emitted from the semiconductor laser incident to the probe 1 at a high efficiency. This semiconductor laser is excited by a drive circuit 8. This drive circuit 8 also has a switching function by which the laser beam emitted from the semiconductor laser can be switched on and off.

The medium 2 is a one-inch disk that is made of a cobalt platinum multilayer film as one kind of magneto-optical materials. This cobalt platinum thin film is formed by molecular beam epitaxy, and its surface roughness is about 5 nm to a period of 20 nm. Before recording, the disk 2 is initialized, or magnetized in the same direction. Also, the bits 5 illustrated in FIG. 3 are previously provided in the disk, so that tracking servo can be performed to make the intensity of the light signal from the bits 5 constant.

The disk 2 is placed on a disk rotating mechanism or moving mechanism 13. This disk rotating mechanism or moving mechanism 13 has a vibration-free mechanism provided which employs compressed air. In addition, a disk holder 14 is provided which is made of glass so that light can be penetrated through the disk holder and detected on the rear side of the disk.

With this arrangement, the semiconductor laser is excited and the disk is rotated. Upon recording information, the laser is turned off and on when the information is "0" and "1", respectively. When the laser is in the on state, the disk is heated at a specific place. As a result, the magnetism at that place is inverted to form a domain. This domain is handled as a recorded unit. This domain has a diameter of about 25 nm since it has substantially the same size as the produced aperture. This domain is repeatedly recorded at the highest density in both the disk movement direction and the track traverse direction to attain a recording density of $1 \times 10^{12}$ bits/inch$^2$.

The domains, or a sequence of information written as above are reproduced by use of magnetooptical effect. With the arrangement of FIG. 5, the semiconductor laser is driven to excite, and the disk 2 is rotated at a revolution rate of 80 turns per second. The penetrated light is focused by an object lens 9 and passed through a polarizing plate 10 to arrive at a photoelectron multiplying tube 11 where the light is detected. The laser beam emitted from the semiconductor laser is polarized, and the polarized plane is rotated by the magnetization within the disk 2. The rotation direction of the polarized plane depends on the direction of the magnetization at the place where the light passes. The rotation direction of the polarized plane can be detected by providing the polarizing plate 10. In addition, a data transfer rate of about $10^8$ Hz can be achieved by this.

The signal produced from the photoelectron multiplying tube 11 is processed by a signal processing circuit 12.

The signal processing circuit 12 has a tracking control function to send the signal to the disk moving mechanism 13 and control the disk position.

Figure 7:
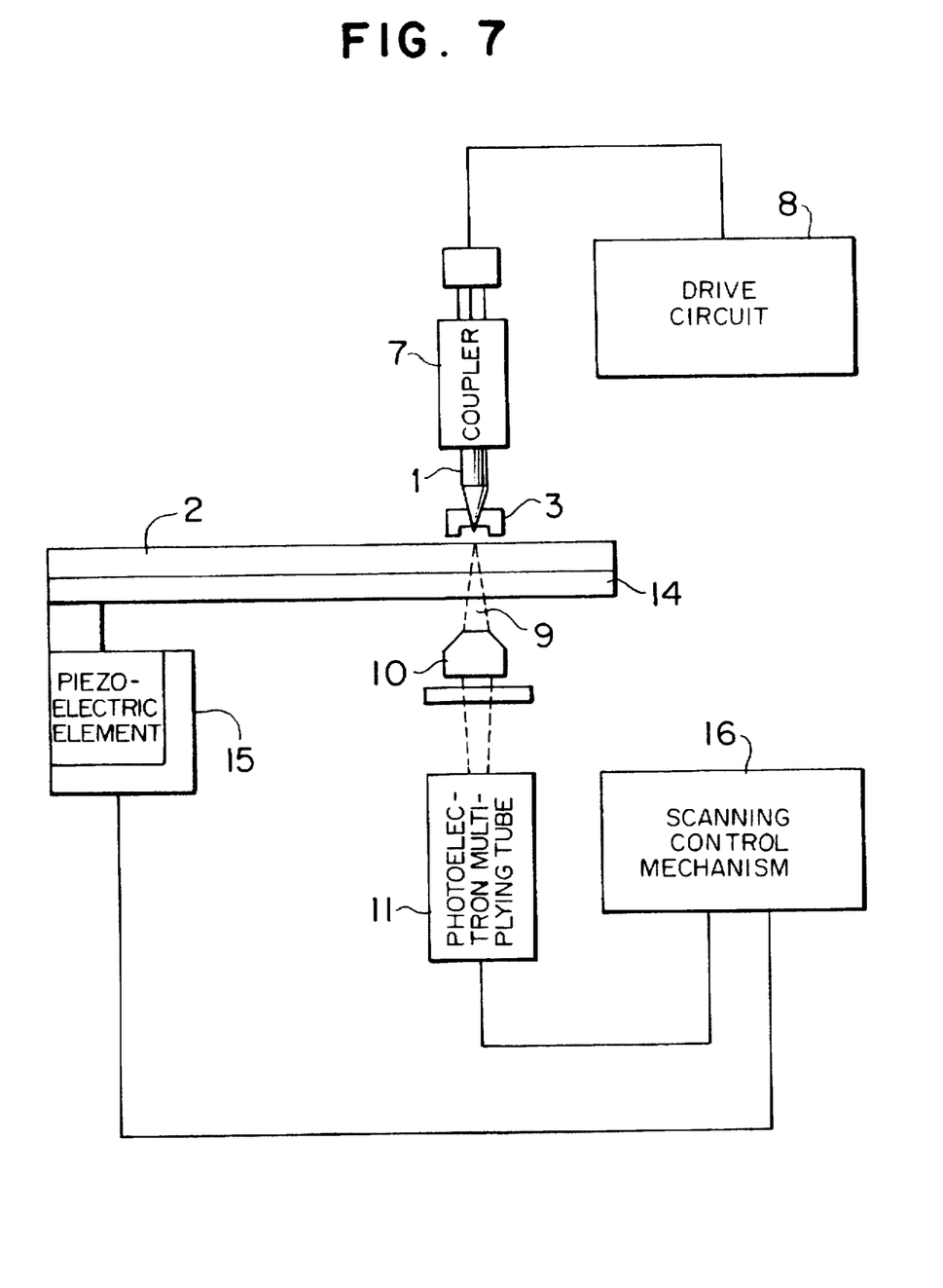
FIG. 7 is a diagram of an XY raster scanning recording apparatus using SNOM representing another embodiment.

The medium is not rotated as a disk, but may be moved for XY raster scanning so that information can be recorded on or reproduced from the medium. FIG. 7 shows another embodiment for this purpose. The elements other than the disk moving mechanism are substantially the same as in FIG. 5. In FIG. 7, a piezoelectric device 15 is used for raster scanning. A scanning control mechanism 16 is added for the signal processing circuit 12 in FIG. 5.

The head is the slider as described above.

The slider is able to keep the raster scanning speed constant, so that the distance between the head and the medium can be maintained constant. Also, the head is not a slider, but may be the probe itself. In this case, the interatomic force between the probe and the medium is detected and used to control the distance between the probe and the medium.

This invention may take other modifications as follows.

1. The interaction between the probe and the medium is associated with at least one of current, force, light, electric field, magnetic field, electromagnetic field, electric charge, magnetization, heat, atomic nucleus spin, electron spin, bonding state or electron state of atoms or molecules in the surface or interior of the medium or probe, and the electromagnetic excitation in the surface or interior of the medium or probe.

2. The head has or is accompanied by a mechanism or structure for controlling the amount of gas or liquid present between the head and the medium.

3. At least part of the head is kept in contact with the medium while the medium is rotated so that information is recorded and/or reproduced.

4. The probe has a structure for protecting the tip of the probe.

5. The distance between the head and the medium is controlled by controlling the signal produced by the interaction between the probe and the medium.

6. The distance between the probe and the medium is controlled by controlling the signal produced by the interatomic force between the probe and the medium.

7. The frequency of the control for the distance between the head and the medium is lower than the frequency at which one-bit information is recorded and/or reproduced.

8. The revolution rate R per second of the disk satisfies $$-10^8/(\pi d_1 \sqrt{B}) \leq R \leq 2 \times 10^9/(\pi d_2 \sqrt{B})$$

where $\pi$ is the ratio of the circumference of a circle to its diameter, d1 (inch) is the outer diameter of the data region on the disk, $d_2$ (inch) is the inner diameter of the data region, and B (bits/inch$^2$) is the data recording density on the disk.

9. The head is controlled for tracking along the marks previously provided on the disk.

10. The marks used for tracking include sets of at least two marks, and the two marks of each set are respectively deviated substantially an equal distance in the opposite directions from the track center.

11. The deviations of the two marks from the track center are 25% of the track width.

12. The surface roughness of the medium is from 10 nm to 200 nm to a period of 1 μm or above, and less than 20 nm to a period of less than 1 μm.

13. When the medium and/or head are at a standstill, the head is kept separated away from the medium.

14. A mechanism is provided to enable the medium to be detached from and remounted in the recording apparatus.

15. A vibration removing mechanism is provided on the whole apparatus, the medium, the support of the head or at least a portion that is in direct or indirect contact with at least part of the support.

Moreover, still other modifications associated with claim 3 are as follows.

16. The opaque material and the aperture are provided at the end of the optical wave guiding path from which light exits.

17. The opaque material and the aperture are provided at the tip of an optical fiber.

18. The distance between the aperture and the medium is kept within the radius of the aperture while information is recorded and/or reproduced.

19. The head has or is accompanied by a mechanism or structure for controlling the amount of a gas or liquid present between the head and the medium.

20. At least part of the head is kept in contact with the medium while the medium is rotated so that information is recorded and/or reproduced.

21. A structure for protecting the aperture is provided at the opaque material and the aperture.

22. The distance between the head and the medium is controlled by controlling the signal produced by the interaction between at least part of the head and the medium.

23. The above interaction is the interatomic force between at least part of the head and the medium.

24. The frequency of the control for the distance between the head and the medium is lower than the frequency at which one-bit information is recorded and/or reproduced.

25. The rotation rate R per second of the disk satisfies $$10^6/(\pi d_1 \sqrt{B}) \leq R \leq 2 \times 10^{11}/(\pi d_2 \sqrt{B})$$

where $\pi$ is the ratio of the circumference of a circle to its diameter, $d_1$(inch) is the outer diameter of the data region on the disk, $d_2$(inch) is the inner diameter of the data region, and B (bits/inch$^2$) is the data recording density on the disk.

26. The head is controlled for tracking along the marks previously provided on the disk.

27. The marks used for tracking include sets of at least two marks, and the two marks of each set are respectively deviated substantially an equal distance in the opposite directions from the track center.

28. The deviations of the two marks from the track center are 25% of the track width.

29. The surface roughness of the medium is from 10 nm to 200 nm to a period of 1 μm or above, and less than 20 nm to a period of less than 1 μm.

30. When the medium and/or head are at a standstill, the head is kept separated away from the medium.

31. A mechanism is provided to enable the medium to be detached from and remounted in the recording apparatus.

32. A vibration removing mechanism is provided on the whole apparatus, the medium, the support of the head or a portion that is in direct or indirect contact with at least part of the support.

33. At least part of the head is the probe of a scanning probe microscope.

34. The head has or is accompanied by a mechanism or structure for controlling the amount of a gas or liquid present between the head and the medium.

35. At least part of the head is kept in contact with the medium while information is recorded and/or reproduced.

36. The distance between the head and the medium is controlled by controlling the signal produced by the interaction between at least part of the head and the medium.

37. The head is positioned along the marks previously provided on the medium.

38. When the data recording density of the medium is represented by B (bits/meter$^2$), the scanning speed v (meters/second$^2$) satisfies $$10^6/\sqrt{B} \leq v \leq 2 \times 10^{11}/\sqrt{B}$$

39. The surface roughness of the medium is from 10 nm to 200 nm to a period of 1 μm or above, and less than 20 nm to a period of less than 1 μm.

40. When the medium and/or the head are at a standstill, the head is kept separated away from the medium.

41. A mechanism is provided to enable the medium to be detached from and remounted in the recording apparatus.

42. A vibration removing mechanism is provided on the medium, the support of the head or a portion that is in direct or indirect contact with at least part of the support.

According to the present invention, the recording unit of information can be reduced to the nanometer order by using the scanning probe microscopy, and therefore a high-density recording apparatus can be attained. Moreover, since the slider is bonded to the tip of the probe, the distance between the probe and the medium can be controlled at high speed with high precision, and thus a high-speed data transfer rate can be achieved. In addition, the head can be controlled for tracking by the tracking marks previously provided on the medium.

What is claimed is:

1. An information recording apparatus for recording an information signal converted to a digital signal or an analog signal on a medium and reproducing said recorded information signal, comprising:

a probe for recording said information signal on said medium at a certain recording density selected from the range of $1 \times 10^{11}$ bits/inch$^2$ to $1.3 \times 10^{16}$ bits/inch$^2$;

a slider supporting said probe, wherein said slider has a structure by which air flow caused by the movement of the medium can be conducted between the probe and the medium and the probe is elevated from the medium by the air flow so that the top of the probe is left by a predetermined distance from the surface of the medium;

a signal processing circuit for processing said signal at a certain speed selected from the range of 100 MHZ to 1 GHz when said recorded information is read out by said probe; and a tracking control mechanism for controlling the position of said probe on said medium.

2. An information recording apparatus for recording an information signal converted to a digital signal or an analog signal on a medium and reproducing said recorded information signal, comprising:

a head for recording said information signal on said medium at a certain recording density selected from the range of $1 \times 10^{11}$ bits/inch$^2$ to $1.3 \times 10^{16}$ bits/inch$^2$, wherein at least part of said head is formed of a single probe of a scanning probe microscope so that said information can be recorded and/or reproduced by use of the interaction between said probe and said medium;

a slider supporting said head, wherein said slider has a structure by which air flow caused by the movement of the medium can be conducted between the head and the medium and the head is elevated from the medium by the air flow so that the to of the head is left by a predetermined distance from the surface of the medium;

a mechanism for rotating said medium of a disk shape; and a tracking control mechanism for controlling the position of said head on said medium.

3. An information recording apparatus for recording an information signal converted to a digital signal or an analog signal on a medium and reproducing said recorded information signal, comprising:

a probe for recording said information signal on said medium at a certain recording density selected from the range of $1 \times 10^{11}$ bits/inch$^2$ to $1.3 \times 10^{16}$ bits/inch$^2$; and at least part of said probe has an opaque material and an aperture provided;

a slider supporting said probe, wherein said slider has a structure by which air flow caused by the movement of the medium can be conducted between the probe and the medium and the probe is elevated from the medium by the air flow so that the top of the probe is left by a predetermined distance from the surface of the medium;

a mechanism for rotating said medium of a disk shape; and a tracking control mechanism for controlling the position of said probe on said medium.

4. An information recording apparatus for recording an information signal converted to a digital signal or an analog signal on a medium and reproducing said recorded information signal, comprising:

a probe for recording said information signal on said medium at a certain recording density selected from the range of $1 \times 10^{11}$ bits/inch$^2$ to $1.3 \times 10^{16}$ bits/inch$^2$;

a slider sup porting said probe, wherein said slider has a structure by which air flow caused by the movement of the medium can be conducted between the probe and the medium and the probe is elevated from the medium by the air flow so that the top of the probe is left by a predetermined distance from the surface of the medium;

a mechanism for moving said medium or said head in order to make raster scanning; and a tracking control mechanism for controlling the position of said probe on said medium.

\* \* \* \* \*

UNITED STATES PATENT AND TRADEMARK OFFICE
CERTIFICATE OF CORRECTION

PATENT NO. : 5,796,706
DATED : Aug. 18, 1998
INVENTOR(S) : Toshimichi Shintani, et al It is certified that error appears in the above-identified patent and that said Letters Patent is hereby corrected as shown below:

| Column | Line | |
|--------|------|---|
| 4 | 10 | Change "$i(\varepsilon\pm\varepsilon^o)=a+b$" to --$i(\varepsilon\pm\varepsilon_o)=a+b$--. |
| 9 | 22 | Change "the to of" to --the top of--. |
| 10 | 23 | Change "sup porting" to --supporting--. |

Signed and Sealed this

Twenty-third Day of March, 1999

Attest:

Q. TODD DICKINSON

*Attesting Officer*     *Acting Commissioner of Patents and Trademarks*